3,230,241
SUBSTITUTED ALLOPREGNANE-6,20-DIONE DERIVATIVES
Harold Russ Nace, Barrington, R.I.
No Drawing. Filed Aug. 20, 1963, Ser. No. 303,434
2 Claims. (Cl. 260—397.4)

This invention relates to novel steroid compounds having useful physiological activity. In a particular aspect, this invention relates to allopregnane-6,20-dione having the 3-position substituted with a 3β-hydroxy group or a 3β-acyloxy group.

The compounds of the present invention exhibit antiestrogenic activity as evidenced by the ability to prevent the increase in uterine weight in rabbits caused by estradiol when administered concurrently with estradiol.

The invention compound, 3β-acyloxyallopregnane-6,20-dione can be prepared by reducing 3β-acyloxy-6-nitropregn-5-ene-20-one with a finely divided metal such as zinc dust in an acid medium. The reduction can be conducted at a temperature between about 50 and 120° C. employing powdered metal catalyst in a quantity between about 100 and 300 weight percent based on the weight of the steroid, in an acid medium such as mineral acid or an organic acid such as acetic acid.

The 3β-acyloxy compounds may be deacylated by treatment with mineral acids in a solvent such as aqueous ethanol to give the 3β-hydroxyallopregnane-6,20-dione.

The steroid compounds of the present invention are potentially useful in the clinical treatment of fertility-sterility problems, gynecological problems relating to irregular menstruation and to other conditions relating to hyperestrogenism. The pounds of the present invention are active on parenteral administration in dosage levels ranging from about 10 milligrams to 1 gram. The compounds are also active topically and may be applied as a constituent in ointments, creams, suspensions and oils.

EXAMPLE 1

*Preparation of 3β-acetoxyallopregnane-6,20-dione*

Zinc dust (2 grams) was added in small portions over a period of about 20 minutes to a solution of 1.0 gram of 3β-acetoxy-6-nitropregn-5-ene-20-one (2.43 millimoles) in 30 milliliters of acetic acid and 3 milliliters of water. The reaction mixture was refluxed for a period of 4 hours, then the hot solution was decanted from the unreacted zinc. The reaction mixture was diluted with water and cooled to cause the product to separate as a crystalline solid. Recrystallization of the product from aqueous methanol yielded 0.58 gram of product, M.P. 155–156° C.

*Analysis.*—Calcd. for $C_{23}H_{34}O_4$: C, 73.80; H, 9.10. Found: C, 73.90; H, 9.23.

EXAMPLE 2

*Preparation of 3β-hydroxyallopregnane-6,20-dione*

A solution of 3β-acetoxyallopregnane-6,20-dione (0.11 gram, 0.29 millimole) and 0.5 milliliter of concentrated hydrochloric acid in 5 milliliters of ethanol was refluxed for 2 hours and then cooled to room temperature. The solution was diluted with water and extracted with several portions of ether. The combined ether extracts were washed with water, dried and distilled in vacuo. The residue was recrystallized from ether to yield 87 milligrams of product, M.P. 186–187° C.

*Analysis.*—Calcd. for $C_{21}H_{32}O_3$: C, 75.90; H, 9.63. Found: C, 75.79; H, 9.63.

What is claimed is:
1. 3β-hydroxyallopregnane-6,20-dione.
2. 3β-acetoxyallopregnane-6,20-dione.

References Cited by the Examiner

Bagli et al.: "J. Org. Chem." (1962), pp. 2938–2940 relied on.

Knights: "Biochemical and Biophysical Research Communications" (1962), pp. 253–258 relied on.

LEWIS GOTTS, *Primary Examiner.*

UNITED STATES PATENT OFFICE
CERTIFICATE OF CORRECTION

Patent No. 3,230,241                        January 18, 1966

Harold Russ Nace

It is hereby certified that error appears in the above numbered patent requiring correction and that the said Letters Patent should read as corrected below.

In the grant, lines 1 to 3, for "Harold Russ Nace, of Barrington, Rhode Island," read -- Harold Russ Nace, of Barrington, Rhode Island, assignor to Richardson-Merrell Inc., of New York, N. Y., a corporation of Delaware, --; line 12, for "Harold Russ Nace, his heirs" read -- Richardson-Merrell Inc., its successors --; in the heading to the printed specification, line 4, for "Harold Russ Nace, Barrington, R. I." read -- Harold Russ Nace, Barrington, R. I., assignor to Richardson-Merrell Inc., New York, N. Y., a corporation of Delaware --; column 1, line 32, for "pounds" read -- compounds --.

Signed and sealed this 29th day of November 1966.

(SEAL)
Attest:

ERNEST W. SWIDER                        EDWARD J. BRENNER
Attesting Officer                      Commissioner of Patents